United States Patent
Lection (12)

(10) Patent No.: US 7,065,718 B2
(45) Date of Patent: Jun. 20, 2006

(54) SYSTEM AND METHOD FOR CONFIGURING TIME RELATED SETTINGS USING A GRAPHICAL INTERFACE

(75) Inventor: David B. Lection, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 710 days.

(21) Appl. No.: 10/214,505

(22) Filed: Aug. 8, 2002

(65) Prior Publication Data
US 2004/0027396 A1    Feb. 12, 2004

(51) Int. Cl.
*G09G 5/00*    (2006.01)

(52) U.S. Cl. .................. 715/863; 715/703; 715/773; 345/179; 368/21; 368/185

(58) Field of Classification Search ............... 715/773, 715/703, 863, 761–765, 866; 345/179, 689; 368/21, 185, 187, 23
See application file for complete search history.

(56) References Cited

U.S. PATENT DOCUMENTS

| 5,247,284 | A | * | 9/1993 | Fleming ..................... 345/156 |
| 5,276,787 | A | | 1/1994 | Searby ....................... 395/132 |
| 5,347,295 | A | | 9/1994 | Agulnick et al. ........... 345/156 |
| 5,444,833 | A | | 8/1995 | Kawai et al. ................ 395/133 |
| 5,485,565 | A | | 1/1996 | Saund et al. ................ 395/142 |
| 5,487,054 | A | * | 1/1996 | Capps et al. ................ 368/185 |
| 5,583,833 | A | * | 12/1996 | Capps et al. ................ 368/185 |
| 5,619,631 | A | | 4/1997 | Schott ........................ 395/140 |
| 5,717,939 | A | | 2/1998 | Bricklin et al. ............. 395/764 |
| D394,609 | S | * | 5/1998 | Kaddoura ................... D10/10 |
| 5,809,267 | A | | 9/1998 | Moran et al. ............... 395/358 |
| 5,848,187 | A | | 12/1998 | Bricklin et al. ............. 382/187 |
| 5,861,886 | A | | 1/1999 | Moran et al. ............... 345/358 |
| 5,864,337 | A | | 1/1999 | Marvin ....................... 715/708 |
| 5,901,115 | A | * | 5/1999 | Katzmann et al. ........... 368/21 |
| 5,930,501 | A | * | 7/1999 | Neil ............................ 713/400 |
| 5,948,040 | A | | 9/1999 | DeLorme et al. ........... 701/201 |
| 5,982,382 | A | | 11/1999 | Benzel ....................... 345/438 |

(Continued)

FOREIGN PATENT DOCUMENTS

EP    0 440 364 A2    8/1991

(Continued)

OTHER PUBLICATIONS

U.S. Appl. No. 09/811,926, filed Mar. 19, 2001, Molander.

(Continued)

*Primary Examiner*—Tadesse Hailu
(74) *Attorney, Agent, or Firm*—VanLeeuwen & VanLeeuwen; Gerald R. Woods

(57) ABSTRACT

A system and method for configuring time related settings using a graphical interface is presented. A user is able to configure a time-of-day and select a time zone on an electronic device using a maximum of two stylus movements. The user contacts a display with the stylus and makes an hour stroke and minute stroke in one motion, without lifting the stylus from the display. The user may adjust a time value by moving the stylus in a clockwise or counterclockwise direction. When the user is satisfied with a time value, the user removes the stylus from the display. If the user wishes to toggle an AM/PM indicator, the user performs a toggle stroke to instruct processing to change the AM/PM indicator. Processing also identifies a time zone corresponding to a radix point which is created during the hour stroke and minute stroke generation.

24 Claims, 7 Drawing Sheets

U.S. PATENT DOCUMENTS

| | | | |
|---|---|---|---|
| 6,018,346 A | 1/2000 | Moran et al. | 345/358 |
| 6,052,110 A | 4/2000 | Sciammarella et al. | 345/145 |
| 6,175,801 B1 | 1/2001 | Millington | 701/207 |
| 6,201,769 B1* | 3/2001 | Lewis | 368/10 |
| 6,233,204 B1* | 5/2001 | Chu et al. | 368/21 |
| 6,275,232 B1 | 8/2001 | Cataudella et al. | 345/349 |
| 6,275,449 B1* | 8/2001 | Wang | 368/21 |
| 6,343,360 B1* | 1/2002 | Feinleib | 713/1 |
| 6,546,368 B1* | 4/2003 | Weninger et al. | 704/270 |
| 6,601,988 B1* | 8/2003 | Molander | 368/187 |
| 6,687,614 B1 | 2/2004 | Ihara et al. | 701/209 |

FOREIGN PATENT DOCUMENTS

| | | |
|---|---|---|
| EP | 0 565 872 A2 | 10/1993 |
| EP | 0 661 620 B1 | 7/1995 |
| EP | 0 667 567 A2 | 8/1995 |

OTHER PUBLICATIONS

"Object-Picking Method by Hierarchical Hand-Marking," *IBM Technical Disclosure Bulletin*, vol. 30 No. 9, Feb. 1988 (pp. 348-350).

* cited by examiner

SYSTEM AND METHOD FOR CONFIGURING TIME RELATED SETTINGS USING A GRAPHICAL INTERFACE

BACKGROUND OF THE INVENTION

1. Technical Field

The present invention relates in general to a system and method for stylus enabled data entry. More particularly, the present invention relates to a system and method for configuring time related information for an electronic device using a stylus.

2. Description of the Related Art

Computer systems, including desktop personal computers and personal digital assistants (PDA's), typically have an interface that allows a user to enter time related information, such as the time of day and a time zone. As part of the time setting configuration process, users are typically asked to enter a time zone, a home city, and a time setting. Computer systems may use time settings to control system operations such as backups, to timestamp file updates, and to timestamp emails.

Computer systems are adding capabilities to increase its "user friendliness". One user-friendly capability that is common on PDA's is a touch sensitive screen. The PDA user uses a stylus to select and manipulate information on the touch sensitive screen. Desktop computer monitors are also starting to have touch-sensitive screen capabilities. By using a touch-sensitive screen with a graphical user interface (GUI), it is easier for a user to enter time related information on a computer system. The GUI may represent time related information in a digital format or an analog format. One digital format approach is where the computer system displays a digital clock with up and down arrow keys to increase or decrease the hour and minute settings. Although effective, this approach is cumbersome to the user because many movements are required. The user must first select an "hour" field with the stylus. Then, the user selects up or down arrow keys with the pointing device until the "hour" field displays the correct hour setting. After the hour setting is correct, the user selects a "minute" field with the stylus and selects up or down arrow keys until the "minute" field displays the correct setting. After the hour and minute setting are correct, the user may need to select an "AM/PM" field to toggle the AM/PM setting.

Many users are more comfortable with configuring time settings using an analog interface. Meaning, the interface displays a clock face, hour hand, and minute hand. Users may prefer this because many clocks, including wall clocks and wrist watches, are analog. Existing analog interfaces, however, still require the user to perform many actions. For example, a user may be required to perform many style strokes in order to configure the time of day. In addition to setting the time of day in a computer system, users are typically asked to enter a time zone and a home city. However, a challenge found with existing art is that the user may be required to access several user interfaces in order to enter each piece of time related information. For example, the time zone setting may be located in a first graphical interface, the home city setting may be in a second graphical interface, and the time of day setting may be in a third graphical interface.

What is needed, therefore, is simple way to enter time related information using a graphical interface with a minimal amount of user actions.

SUMMARY

It has been discovered that the aforementioned challenges are resolved by using a stylus with a geographical map to configure time setting information for an electronic device. The electronic device includes a display which is capable of interpreting stylus commands. For example, the user may be setting the time of day and selecting a time zone on his personal digital assistant (PDA) using a stylus. A user identifies a city location on a geographical map and places the stylus on the display to make an hour stroke and minute stroke without lifting the stylus from the display. The user is able to fine-tune the time settings before lifting the stylus off the display by moving the stylus in a clockwise or counter-clockwise direction. When the user is finished fine-tuning the time setting information, the user lifts the stylus off the display. If desired, the user is able to make one more upstroke with the stylus to toggle an AM/PM setting.

Upon initiation of configuring time related settings, the electronic device displays a map for the user to choose his home city. In one embodiment, the electronic device may show a map of the world and the user may "zoom in" to his particular country or region in order to select the correct city. When an acceptable map is displayed, the user touches the display with his stylus (e.g. stylus starting location), and moves the stylus towards the user's home city location on the map. The electronic device determines the user's desired hour setting based upon the stylus starting location and the user's home city location. For example, if the user moved the stylus from directly below his home city up to his home city, the electronic device determines that the user's desired hour setting is six o'clock.

Once the user reaches his home city on the map, a clock face is superimposed on the map. The user moves the stylus away from the home city location in a direction corresponding to the user's desired minute setting. For example, if the user moves the stylus away from his home city location in an eastward direction (i.e. to the right), the electronic device determines that the user's desired minute setting is fifteen minutes. The electronic device identifies and stores a time zone corresponding to the user's home city.

When the user's stylus exits the superimposed clock face, a digital time setting appears which is a digital representation of the user's analog time setting selection. The user is able to move the stylus along the outside perimeter of the clock face clockwise to advance the time setting or counterclockwise to decrease the time setting. Once the user is satisfied with the time setting, the user removes the stylus from the display. If the user chooses, the user is able to toggle the AM/PM setting by performing an upstroke motion with his stylus on the display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1A:
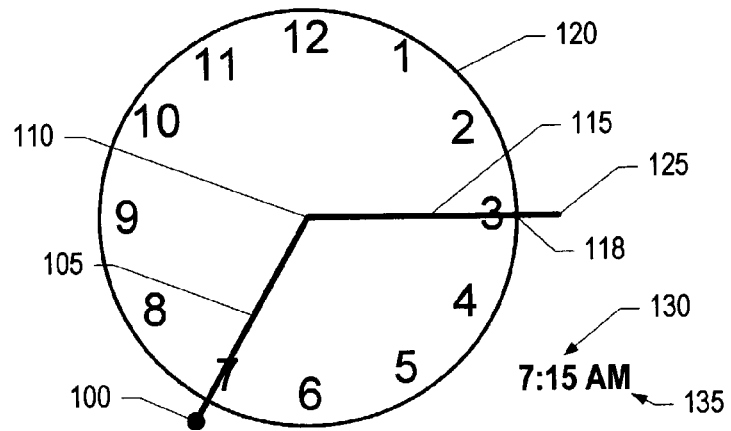
FIG. 1A is a diagram showing a user configuring an initial time setting using a stylus mechanism.

FIG. 1A is a diagram showing a user configuring an initial time setting using a stylus mechanism. The user wishes to set the time of day on an electronic device which includes a display that is capable of interpreting stylus commands. As will be appreciated by those skilled in the art, a stylus may be a pointing device capable of selecting a location on a display, such as a pencil, a rigid object, or a finger. For example, the user may be setting the time of day on his personal digital assistant (PDA) which includes a touch-sensitive display.

The user first contacts the display with his stylus at stylus starting location 100 located on the outside of clock face 120's perimeter. The user selects stylus starting location 100 based upon the user's desired hour setting (see below for further details regarding hour setting determination). The user moves the stylus along hour stroke 105 until the stylus reaches radix point 110. Radix point 110 is the point at which the user finishes hour stroke 105 and begins minute stroke 115. Processing identifies the user's desired hour setting using stylus starting location 100 and radix point 110. In the example shown in FIG. 1A, the initial hour setting is seven o'clock.

The user moves the stylus along minute stroke 115, through exit point 118, to location 125. Processing identifies the user's desired minute setting based upon radix point 110 and exit point 125. Processing displays initial time setting 130 on the user's display along with AM/PM setting 135. In the example shown in FIG. 1A, the initial time setting is 7:15 and the AM/PM setting is "AM". In one embodiment, the AM/PM setting may be configured to default to "AM".

Figure 1B:
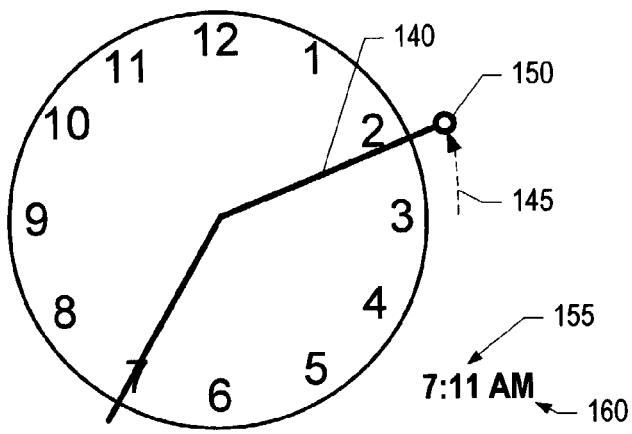
FIG. 1B is a diagram showing a user fine-tuning an initial time setting for an electronic device using a stylus mechanism.

When the user moves his stylus through exit point 118, minute stroke 115 "floats" and the user may move his stylus clockwise or counterclockwise along the outside perimeter of clock face 120 to fine tune the time setting (see FIG. 1B and corresponding text for further details regarding fine tuning time settings).

FIG. 1B is a diagram showing a user fine-tuning an initial time setting for an electronic device using a stylus mechanism. The electronic device includes a display that is capable of interpreting stylus commands. When the user configures the initial time setting on the electronic device, the user continues to hold the stylus on the display and is able to fine tune the time setting by moving the stylus clockwise (to advance the time setting) or counterclockwise (to decrease the time setting) (see FIG. 1A and corresponding text for further details regarding initial time setting configuration).

In the example shown in FIG. 1B, the user moves the stylus along arc 145 to move minute stroke 140. When the user moves the stylus counterclockwise along arc 145, the initial time setting decreases and is displayed at location 155. Once the user approves of the time setting, the user removes the stylus from the display at stylus liftoff point 150. In the example shown in FIG. 1B, the user's stylus liftoff point time setting is 7:12. If the user wishes to change the hour setting, the user may move the stylus clockwise or counterclockwise one full rotation. Once the user accepts the time settings by lifting the stylus from the touch sensitive display, the user is able to change AM/PM setting 160 (see FIG. 1C and corresponding text for further details regarding AM/PM setting).

Figure 1C:
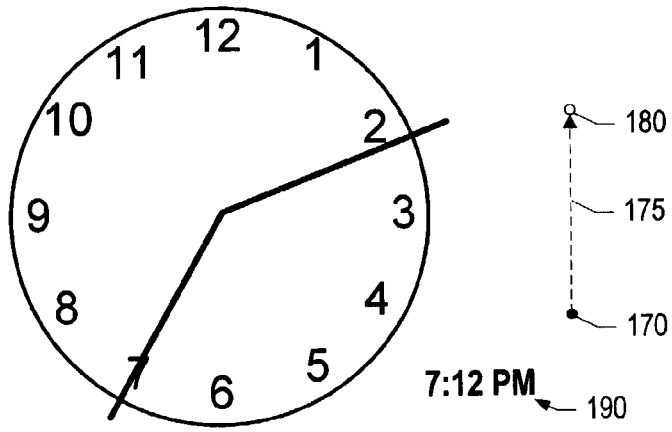
FIG. 1C is a diagram showing a user toggling an AM/PM setting using a stylus mechanism with an electronic device.

FIG. 1C is a diagram showing a user toggling an AM/PM setting using a stylus mechanism with an electronic device. The electronic device includes a display that is capable of interpreting stylus commands. For example, the display may be a touch sensitive display used on a personal digital assistant (PDA). The user changes the AM/PM setting by placing the stylus at toggle starting location 170, and moves the stylus in an upward motion along toggle stroke 175 until the stylus reaches toggle liftoff location 180 at which point the user removes the stylus from the display. Processing changes AM/PM setting 190 in response to toggle stroke 175. In the example shown in FIG. 1C, processing changes AM/PM setting 190 to "PM" in relation to FIG. 1B's AM/PM setting of "AM".

Figure 2A:
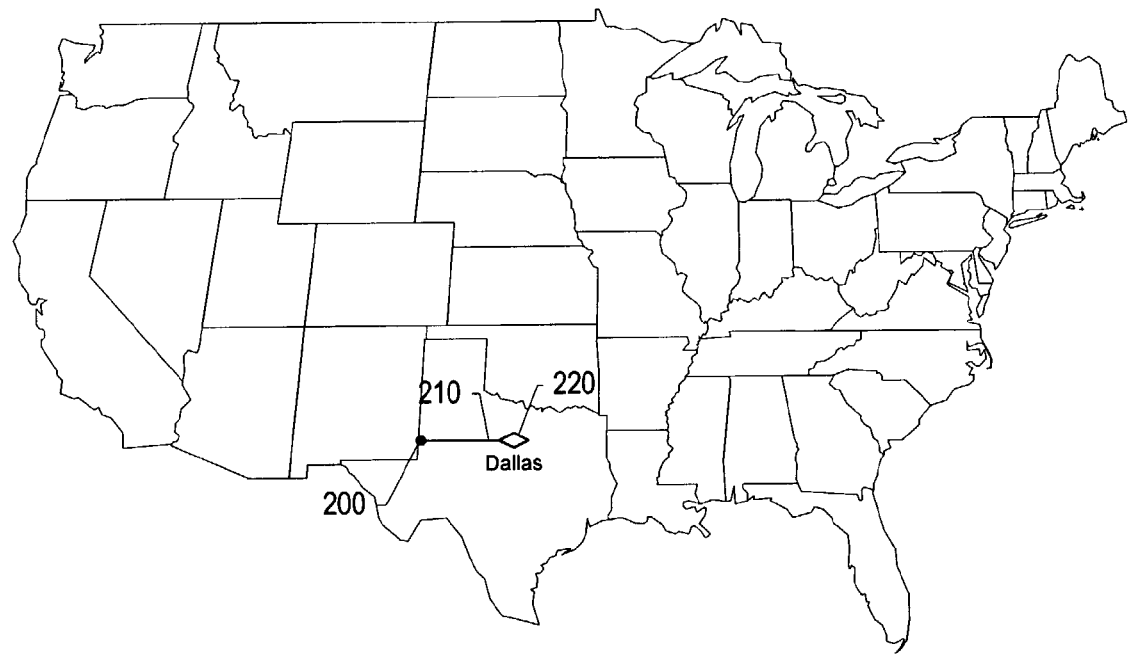
FIG. 2A is a diagram showing a user configuring an hour setting and selecting a time zone using a stylus mechanism with an electronic device.

FIG. 2A is a diagram showing a user configuring an hour setting and selecting a time zone using a stylus mechanism with an electronic device. The electronic device includes a display that is capable of interpreting stylus commands. For example, the display may be a touch sensitive display used on a personal digital assistant (PDA).

The electronic device displays a map for the user to choose a city corresponding to his time zone. In one embodiment, the electronic device may show a map of the world and the user may "zoom in" to his particular country or region in order to select the correct city. When an acceptable map is displayed, the user touches the display with his stylus at stylus starting location 200 with his stylus. The user selects stylus starting location 200 based upon the user's desired hour setting and time zone setting (see FIG. 1A and corresponding text for further details regarding hour setting). The user moves the stylus along hour stroke 210 until the stylus reaches the user's desired city. In the example shown in FIG. 2A, the user's desired city is Dallas located at radix point 220. Once the user reaches radix point 220, processing identifies a city and time zone corresponding to radix point 220 (see FIG. 5 and corresponding text for further details regarding city and time zone identification).

Figure 2B:
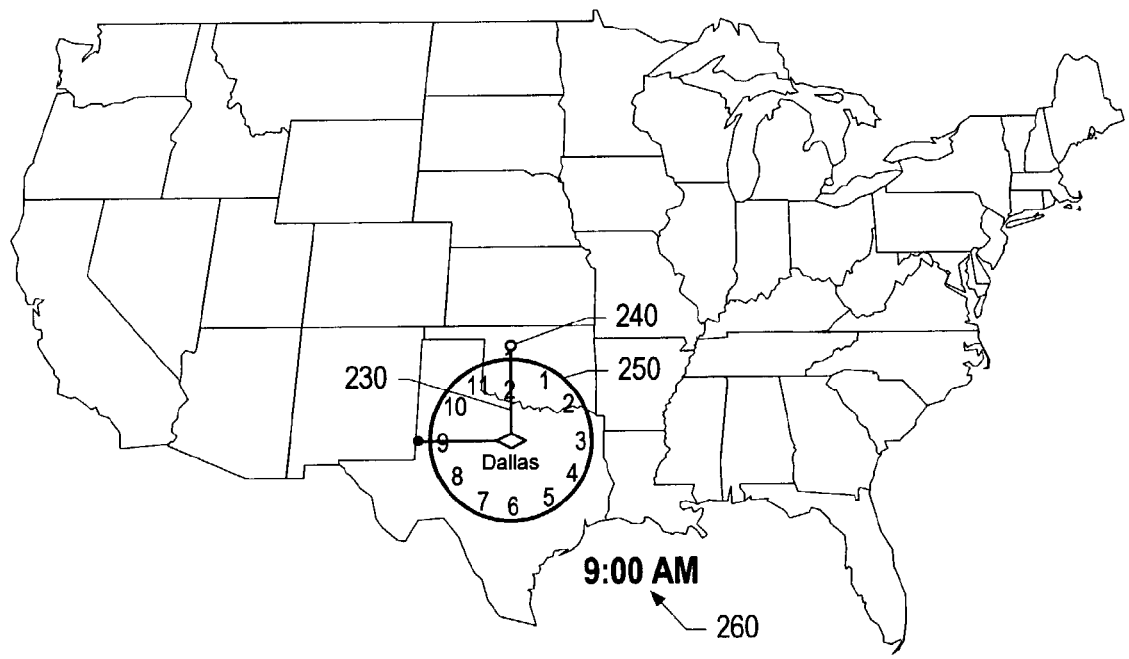
FIG. 2B is a diagram showing a user configuring a minute setting using a stylus mechanism with an electronic device.

FIG. 2B is a diagram showing a user configuring a minute setting using a stylus mechanism with an electronic device. The electronic device includes a display that is capable of interpreting stylus commands. For example, the display may be a touch sensitive display used on a personal digital assistant (PDA). The user configures an hour setting and a time zone setting by generating an hour stroke that ends at a city corresponding to his time zone (see FIG. 2A and corresponding text for further details regarding time zone and hour setting). The user moves the stylus along minute stroke 230 which corresponds to the minute setting that the user wishes to enter. In the example shown in FIG. 2B, the user wishes to configure the electronic device's time setting for 9:00 Central Standard Time.

Processing superimposes clock face 250 when the user starts minute stroke 230. Clock face 250 assists the user in selecting the minute setting. When the user's stylus exits clock face 250, time setting 260 appears which is a digital representation of the user's time setting selection. The user is able to move his stylus along the outside perimeter of clock face 250 clockwise to advance the time setting or counterclockwise to decrease the time setting (see FIG. 1B and corresponding text for fine-tuning adjustments). Once the user is satisfied with the time setting, the user removes the stylus at liftoff point 240. The user is able to toggle the AM/PM setting with an upstroke motion using his stylus (see FIG. 1C and corresponding text for further details regarding AM/PM toggle).

Figure 3A:
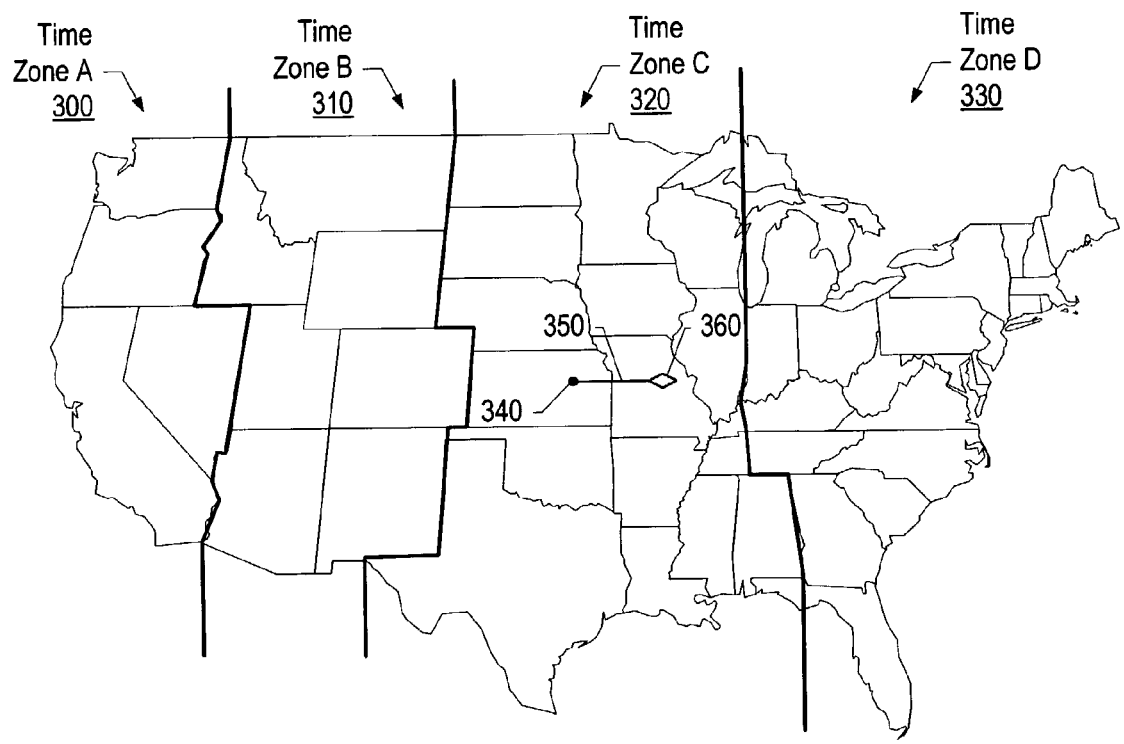
FIG. 3A is a diagram showing a user configuring an hour setting and selecting a time zone using a stylus mechanism.

FIG. 3A is a diagram showing a user configuring an hour setting and selecting a time zone using a stylus mechanism. A user wishes to configure time settings on his electronic device which includes a display that is capable of interpreting stylus commands. For example, the display may be a touch sensitive display used on a personal digital assistant (PDA). The electronic device displays a geographical map that includes segmented time zones. In the example shown in FIG. 3A, processing displays a map with time zone A 300, time zone B 310, time zone C 320, and time zone D 330. This embodiment may be preferred in applications where a user's display size is too small to adequately display city locations and in applications where a city time is not required.

Processing identifies a time zone when the user contacts the display at a location within one of the four time zones. The example in FIG. 3A shows that the user requests processing to identify time zone C 320 as the user's time zone. The user selects stylus starting location 340 based upon the user's desired hour setting and time zone setting (see FIG. 1A and corresponding text for further details regarding hour settings). The user moves the stylus along hour stroke 350 for a particular length. In one embodiment, the length of the hour stroke may determine the size of a superimposed clock face (see FIG. 3B and corresponding text for further details regarding superimposing a clock face).

Once the user ends hour stroke 350 at radix point 360, processing identifies a time zone corresponding to either stylus starting location 340 or radix point 360. The user is ready to start a minute stroke corresponding to his desired time setting (see FIG. 3B and corresponding text for further details regarding minute stroke settings).

Figure 3B:
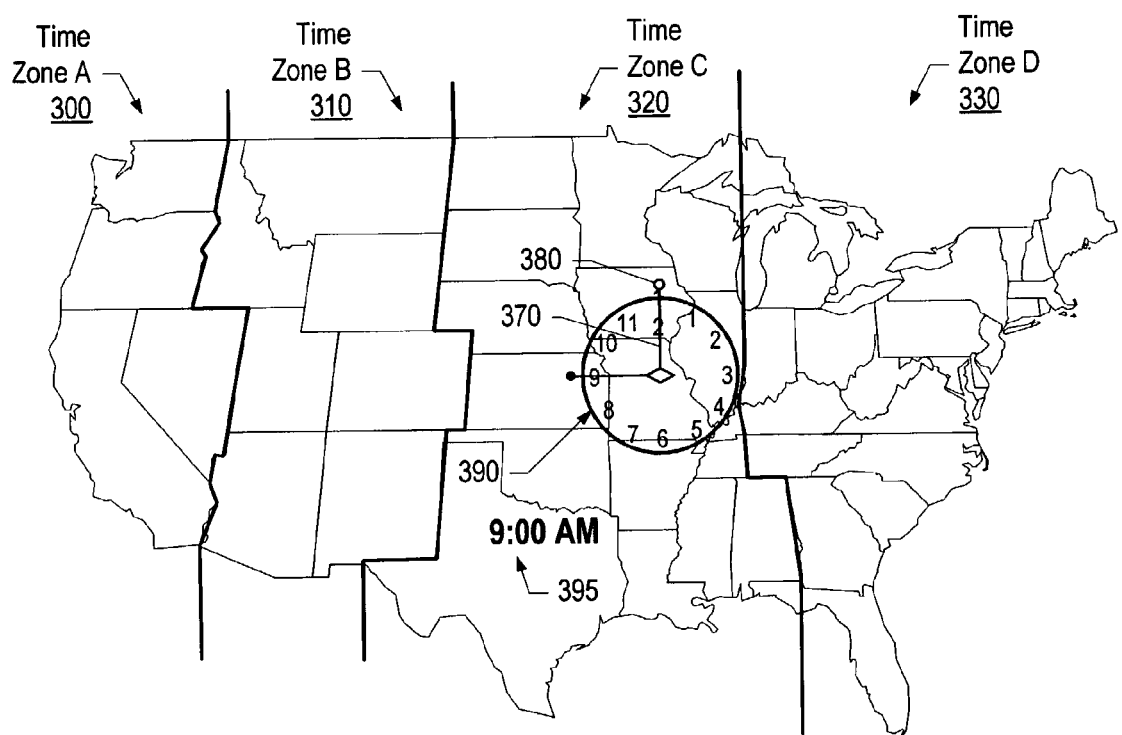
FIG. 3B is a diagram showing a user configuring a minute setting for a particular time zone using a stylus mechanism.

FIG. 3B is a diagram showing a user configuring a minute setting for a particular time zone using a stylus mechanism. The user configures an hour setting and a time zone setting by generating an hour stroke in a particular time zone shown on a map (see FIG. 3A and corresponding text for further details regarding time zone and hour setting). FIG. 3B shows a map segmented into time zone A 300, time zone B 310, time zone C 320, and time zone D 330. Once the user finishes the hour stroke, the user moves the stylus along minute stroke 370 in a direction corresponding to the time that the user wishes to enter. In the example shown in FIG. 3B, the user wishes to configure the electronic device's time setting for 9:00 Central Standard Time.

Processing superimposes clock face 390 when the user starts minute stroke 370. In one embodiment, the size of clock face 390 may be relative to the length of the hour stroke. When the user's pointing device exits clock face 390, time setting 395 appears which is a digital representation of the user's time setting selection. The user is able to move his stylus along the outside perimeter of clock face 390 clockwise to advance the time setting or counterclockwise to decrease the time setting (see FIG. 1B and corresponding text for fine-tuning adjustments). Once the user is satisfied with the time setting, the user removes the pointing device at liftoff point 380. The user is able to toggle an AM/PM setting with an upstroke motion using his stylus (see FIG. 1C and corresponding text for further details regarding AM/PM toggle).

In one embodiment, a user may change time zones (i.e. change the hour setting) without changing the minute setting. In this embodiment, the user select a time zone using his stylus (i.e. time zone change touch down) in which processing compares the selected time zone with a stored time zone and changes the time value if the selected time zone is in a different time zone location than the stored time zone.

Figure 4:
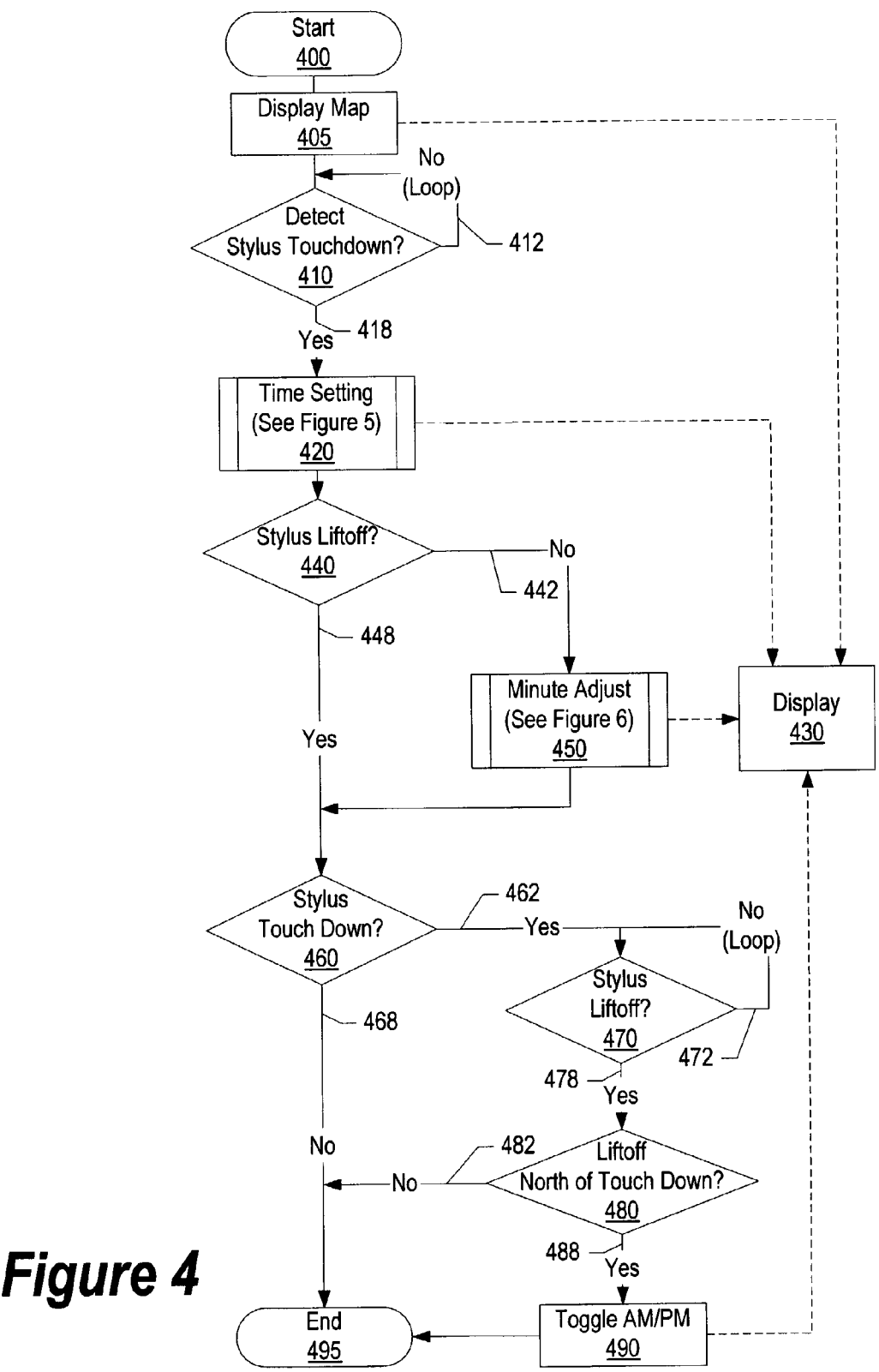
FIG. 4 is a high level flowchart showing steps taken in configuring time settings using a stylus mechanism.

FIG. 4 is a high level flowchart showing steps taken in configuring time settings using a stylus mechanism. A user wishes to configure time settings on his electronic device which includes a display that is capable of interpreting stylus commands. For example, the display may be a touch sensitive display used on a personal digital assistant (PDA). Processing commences at 400, whereupon processing displays a map on display 430. For example, the map may be an image of the United States that shows each state and major cities. In one embodiment, the map may be an image of the world and a user may select a region of the world for processing to display a more detailed image of the selected region.

A determination is made as to whether the user has contacted the display with the stylus (decision 410). If processing does not detect a stylus touchdown, decision 410 branches to No branch 412 which loops back to wait for the stylus to touch the display.

Figure 5:
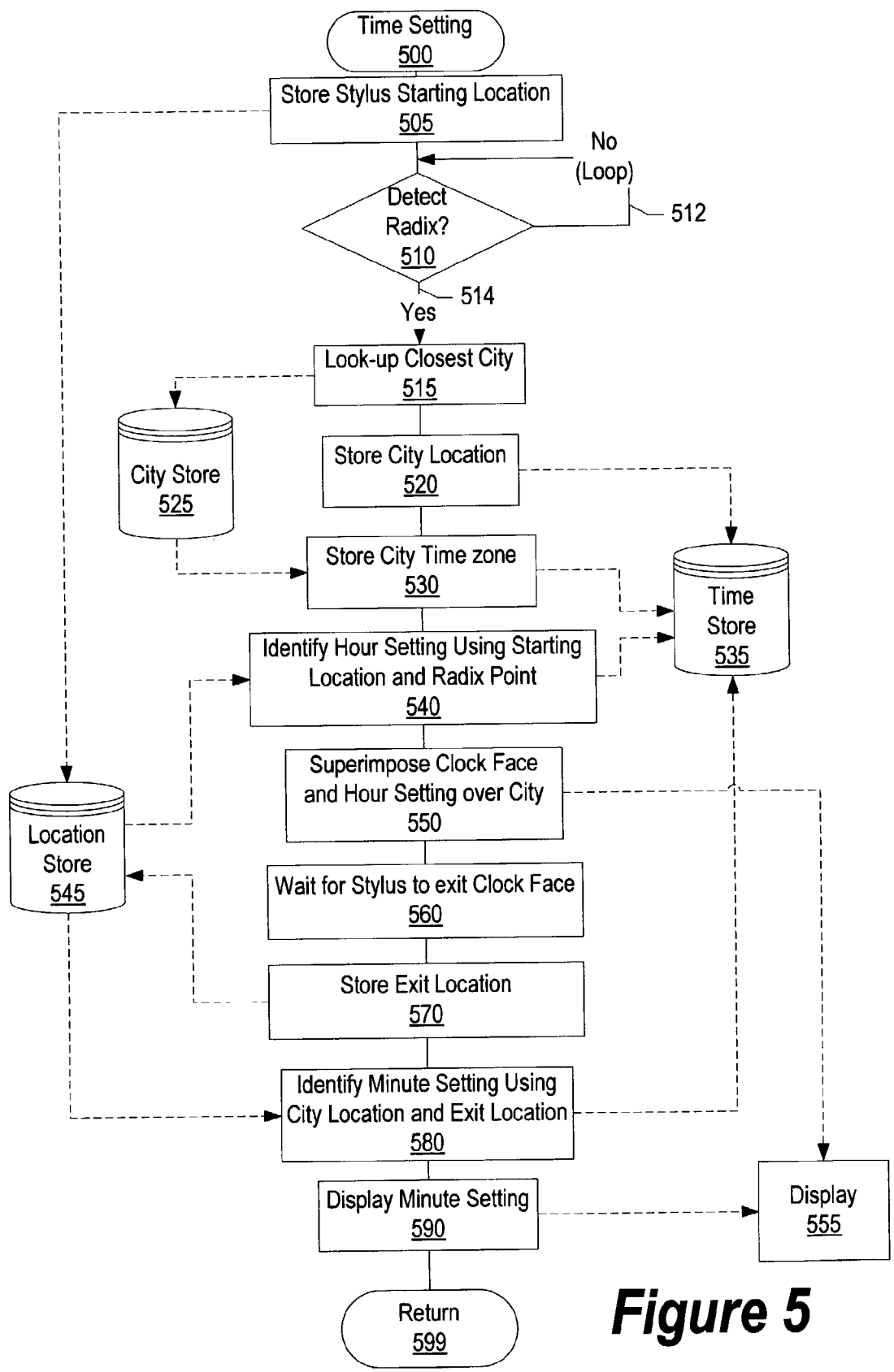
FIG. 5 is a flowchart showing steps taken in identifying a city time zone and configuring an initial time setting.

On the other hand, if processing detects a stylus touchdown, decision 410 branches to "Yes" branch 418 whereupon processing configures an initial time setting and displays the initial time setting on display 430 (pre-defined process block 420, see FIG. 5 and corresponding text for further details).

A determination is made as to whether the user wishes to fine-tune the initial time setting (decision 440). This determination may be made by detecting whether the user "lifts off", or removes, the stylus from the display. If the user has not lifted off the stylus from the display, decision 440 branches to "No" branch 442 whereupon processing fine-tunes the time setting and displays the adjusted time setting on display 430 (pre-defined process block 450, see FIG. 6 and corresponding text for further details).

On the other hand, if the user does not wish to fine-tune the initial time setting (i.e. removed the stylus from the display), decision 440 branches to "No" branch 448 bypassing fine tuning steps. A determination is made as to whether the user wishes to change the AM/PM setting by touching the stylus down on the display (decision 460). For example, the default AM/PM indicator may be "AM" and the user may use his stylus to perform an upstroke motion on the display to inform processing to toggle (i.e. change) the AM/PM indicator to "PM". If the user does not touch the stylus on the display, decision 460 branches to "No" branch 468 bypassing AM/PM toggle steps. In one embodiment, processing may wait for a pre-configured amount of time, such as one minute, to detect whether the user touches the stylus on the display to change the AM/PM indicator.

On the other hand, if the user touches the stylus on the display, decision 460 branches to "Yes" branch 462 whereupon a determination is made as to whether the user removes the stylus from the display (i.e. finished the upstroke command). If the stylus is still in contact with the display, decision 470 branches to "No" branch 472 which loops back to continue monitoring the stylus movement. This looping continues until the user removes the stylus from the display, at which point decision 470 branches to "Yes" branch 478.

A determination is made as to whether the stylus liftoff point is North of the touch down point, such as with an upstroke command (decision 480). If the stylus liftoff point is not north of the touch down point, decision 480 branches to "No" branch 482 bypassing AM/PM toggle steps. On the other hand, if the stylus liftoff point is north of the touch down point, decision 480 branches to "Yes" branch 488 whereupon processing toggles the AM/PM indicator on display 430 (step 490). In one embodiment, the AM/PM stroke command may be different than an upstroke command (i.e. a down stroke). In this embodiment, the determination as to the location of the liftoff point relative to the touch down point changes accordingly (i.e. South). Processing ends at 495.

FIG. 5 is a flowchart showing steps taken in identifying a city time zone and configuring an initial time setting. Processing commences at 500, whereupon processing stores a stylus starting location. The stylus starting location is the location where a user first contacts a display using a stylus. For example, the display may be a touch sensitive display on a personal digital assistant (PDA).

The user selects a stylus starting location based upon his city location and his desired hour setting (see FIG. 2A and corresponding text for further details regarding hour stroke generation). The user moves the stylus from the stylus starting location to the city location on the map to create an hour stroke. For example, if the user lives in Dallas, Tex. and the time is 6:15 PM, the user selects a stylus starting location on the map directly below Dallas, Tex., and moves the stylus up to Dallas, Tex.

Once the user's stylus reaches the city location on the map, the user moves the stylus away from the city in a direction corresponding to a minute setting (minute stroke). When the stylus changes direction, a radix point is created at or near the city location on the map. The radix point is the point at which the hour stroke ends and the minute stroke begins. Using the example described above, the user moves the stylus from Dallas directly to the right (east) to represent fifteen minutes (see FIG. 2B and corresponding text for further details regarding minute stroke generation).

A determination is made as to whether a radix point is detected corresponding to the change in direction of the stylus (decision 510). If processing has not detected a radix point, decision 510 branches to "No" branch 512 which loops back to continue tracking the stylus. This looping continues until the user changes direction of the stylus and processing detects the radix point, at which point decision 510 branches to "Yes" branch 514.

Processing looks-up a city in city store 525 whose location on the displayed map is closest to the radix point (step 515). Using the example described above, processing identifies Dallas, Tex. as the closest city corresponding to the direction change between the hour stroke and the minute stroke. City store 525 may be stored on a non-volatile storage area, such as non-volatile memory. Processing stores the city location in time store 535 (step 520). Time store 535 may be stored on a non-volatile storage area, such as non-volatile memory. A time zone corresponding to the city is retrieved from city store 525 and stored in time store 535 (step 530). Using the example described above, processing stores "Central Standard Time" in time store 535 corresponding to Dallas, Tex.

Processing retrieves the stylus starting location from location store 545 and identifies the user's intended hour setting using the stylus starting location and the radix point, and stores the intended hour setting in time store 535 (step 540). In one embodiment, the hour setting may be derived by representing twelve o'clock as a zero degree position, calculating an hour stroke angle corresponding to the twelve o'clock position using the stylus starting location and radix point, and determining the hour setting based upon the hour stroke angle. As will be appreciated by those skilled in the art, trigonometry may be used to calculate the hour stroke angle in degrees or radians.

Processing superimposes a clock face and the intended hour setting over the map on display 555 at step 550. Processing waits for the stylus to finish the minute stroke and exit the clock face (step 560). Once the stylus exits the clock face, processing stores the stylus exit location in location store 545 (step 570).

Processing identifies the minute setting using the radix point and the stylus exit location, and stores the minute setting in time store 535 (step 580). In one embodiment, the minute setting may be derived by representing twelve o'clock as a zero degree position, calculating a minute stroke angle corresponding to the twelve o'clock position using the radix point and the stylus exit location, and determining the minute setting based upon the minute stroke angle. As will be appreciated by those skilled in the art, trigonometry may be used to calculate the minute stroke angle in degrees or radians. Processing displays the minute setting on display 555 at step 590. Processing returns at 599.

Figure 6:
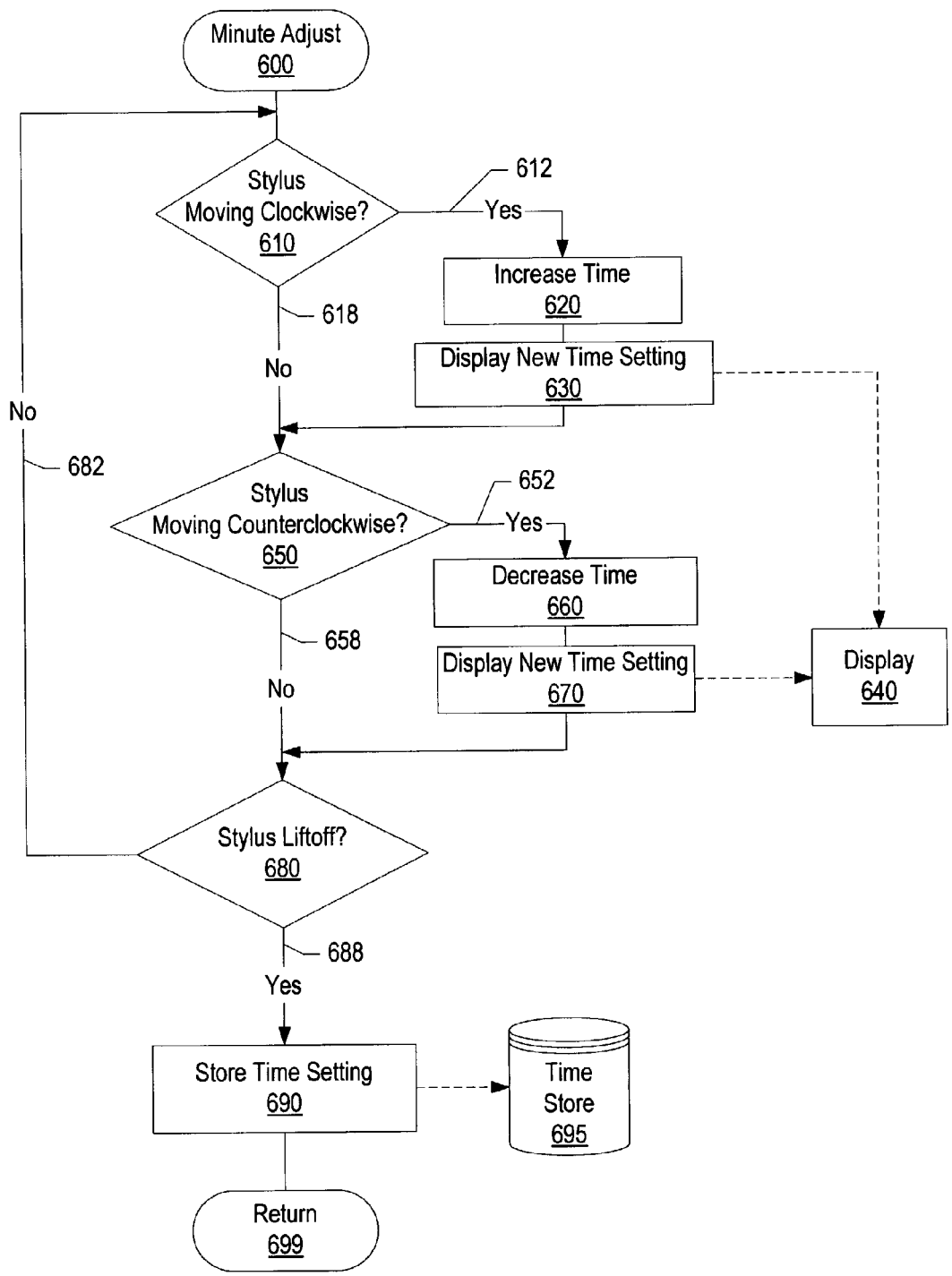
FIG. 6 is a flowchart showing steps taken in fine tuning an initial time setting.

FIG. 6 is a flowchart showing steps taken in fine tuning an initial time setting. Fine-tuning mode is initiated when a user moves a stylus out of a clock face without removing the stylus from a display surface (see FIG. 4 and corresponding text for further details regarding fine-tuning initiation). A determination is made as to whether the stylus is moving in a clockwise direction (decision 610). If the stylus is moving in a clockwise direction, decision 610 branches to "Yes" branch 612 whereupon processing increases the initial city time setting (step 620), and displays the new time setting on display 640 (step 630). In one embodiment, the minute setting corresponding to the new time setting may be derived by representing twelve o'clock as a zero degree position, calculating a minute stroke angle corresponding to the twelve o'clock position using the radix point and the stylus liftoff point, and determining the minute setting based upon the minute stroke angle.

On the other hand, if the stylus is not moving in a clockwise direction, decision 610 branches to "No" branch 618 bypassing time increment steps. A determination is made as to whether the stylus is moving in a counterclockwise direction (decision 650). If the stylus is moving in a counterclockwise direction, decision 650 branches to "Yes" branch 652 whereupon processing decreases the initial time setting (step 660), and displays a new time setting on display 640 (step 670). On the other hand, if the stylus is not moving in a counterclockwise direction, decision 650 branches to "No" branch 658 bypassing time decrement steps.

A determination is made as to whether the stylus is removed (i.e. lifted off) from the display surface (decision 680). If the stylus is still in contact with the display surface, decision 680 branches to "No" branch 682 which loops back to process more stylus movements. This looping continues until the stylus is removed from the display surface, at which point decision 680 branches to "Yes" branch 688.

Processing stores an adjusted time setting in time store 695 at step 690. Time store 695 may be stored on a non-volatile storage area, such as non-volatile memory. Processing returns at 699. In one embodiment, the user may move the stylus clockwise one complete revolution to increase an hour setting and may move the stylus counterclockwise one complete revolution to decrease the hour setting.

Figure 7:
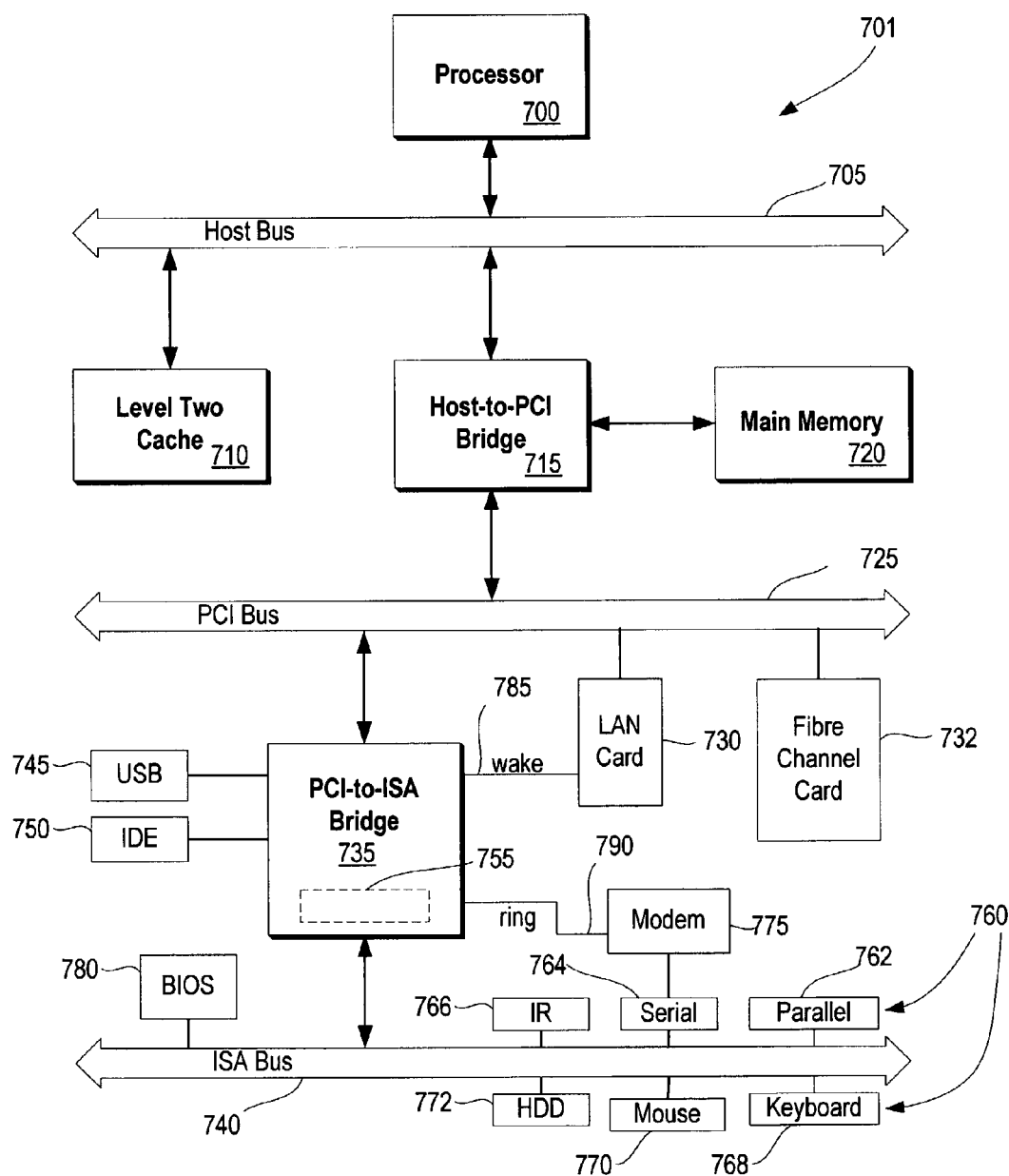
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of configuring time related settings using a single stylus movement, said method comprising:
    displaying a geographical map on a display;
    detecting a stylus starting location and a movement of a stylus, the stylus starting location corresponding to a location where the stylus contacts the display and the movement corresponding to a plurality of second locations to which the stylus is moved while contacting the display;
    determining a radix point, the radix point corresponding to a change in direction of the movement;
    identifying a stylus liftoff point, the stylus liftoff point corresponding to a location where the stylus discontinues contact with the display; and
    calculating a time value wherein the calculating is performed using the stylus starting location, the radix point, and the stylus liftoff point.

2. The method as described in claim 1 further comprising:
    superimposing a clock face on the geographical map wherein the clock face includes an hour hand and a minute hand, the center of the clock face corresponding to the location of the radix point;
    computing an hour stroke angle using the stylus starting location and the radix point;
    deriving an hour setting based upon the hour stroke angle;
    computing a minute stroke angle using the radix point and the liftoff point;

deriving a minute setting based upon the minute stroke angle; and displaying the time value on the clock face using the minute hand and the hour hand wherein the position of the minute hand corresponds to the minute setting and the position of the hour hand corresponds to the hour setting.

3. The method as described in claim 2 further comprising:

sensing the stylus movement in a clockwise or a counterclockwise direction subsequent to the superimposing;

re-calculating the time value in response the sensing, the recalculating resulting in a changed time value; and displaying the changed time value on the clock face using the minute hand and the hour hand.

4. The method as described in claim 2 wherein the size of the clock face corresponds to the distance between the stylus starting location and the radix point.

5. The method as described in claim 1 wherein a first time zone is selected corresponding to the radix point.

6. The method as described in claim 5 further comprising:

detecting a time zone change touch down, the time zone change touch down corresponding to a second location where the stylus contacts the display subsequent to the selection of the first time zone;

comparing the time zone change touch down location with the first time zone;

changing the time value based upon the comparing, wherein the changing results in a changed time value; and displaying the changed time value.

7. The method as described in claim 1 further comprising:

detecting a toggle starting location, the toggle starting location corresponding to a second location where the stylus contacts the display subsequent to the identification of the stylus liftoff point;

identifying a toggle ending location, the toggle ending location corresponding to a location where the stylus discontinues contact with the display subsequent to the detected toggle starting location;

determining whether to toggle AM/PM indicator based upon the location of the toggle starting location and the toggle ending location; and toggling the AM/PM indicator in response to the determination.

8. An information handling system comprising:

one or more processors;

a memory accessible by the processors;

one or more nonvolatile storage devices accessible by the processors;

a display accessible by the processors; and a time setting tool to configure time using a single stylus movement, the time setting tool including:

display logic for displaying a geographical map on the display;

detection logic for detecting a stylus starting location and a movement of a stylus, the stylus starting location corresponding to a location where the stylus contacts the display and the movement corresponding to a plurality of second locations to which the stylus is moved while contacting the display;

determination logic for determining a radix point, the radix point corresponding to a change in direction of the movement;

identification logic for identifying a stylus liftoff point, the stylus liftoff point corresponding to a location where the stylus discontinues contact with the display; and computational logic for calculating a time value wherein the calculating is performed using the stylus starting location, the radix point, and the stylus liftoff point.

9. The information handling system as described in claim 8 further comprising:

imaging logic for superimposing a clock face on the geographical map wherein the clock face includes an hour hand and a minute hand, the center of the clock face corresponding to the location of the radix point;

computational logic for computing an hour stroke angle using the stylus starting location and the radix point;

derivation logic for deriving an hour setting based upon the hour stroke angle;

computational logic for computing a minute stroke angle using the radix point and the liftoff point;

derivation logic for deriving a minute setting based upon the minute stroke angle; and display logic for displaying the time value on the clock face using the minute hand and the hour hand wherein the position of the minute hand corresponds to the minute setting and the position of the hour hand corresponds to the hour setting.

10. The information handling system as described in claim 9 further comprising:

detection logic for sensing the stylus movement in a clockwise or a counterclockwise direction subsequent to the superimposing;

calculation logic for recalculating the time value in response the sensing, the recalculating resulting in a changed time value; and display logic for displaying the changed time value on the clock face using the minute hand and the hour hand.

11. The information handling system as described in claim 8 wherein a first time zone is selected corresponding to the radix point.

12. The information handling system as described in claim 11 further comprising:

detection logic for detecting a time zone change touch down, the time zone change touch down corresponding to a second location where the stylus contacts the display subsequent to the selection of the first time zone;

comparison logic for comparing the time zone change touch down location with the first time zone;

change logic for changing the time value based upon the comparing, wherein the changing results in a changed time value; and display logic for displaying the changed time value.

13. The information handling system as described in claim 8 further comprising:

detection logic for detecting a toggle starting location, the toggle starting location corresponding to a second location where the stylus contacts the display subsequent to the identification of the stylus liftoff point;

identification logic for identifying a toggle ending location, the toggle ending location corresponding to a location where the stylus discontinues contact with the display subsequent to the detected toggle starting location;

determination logic for determining whether to toggle an AM/PM indicator based upon the location of the toggle starting location and the toggle ending location; and toggle logic for toggling the AM/PM indicator in response to the determination.

14. A computer program product stored in a computer operable media for configuring time related settings, said computer program product comprising:
  means for displaying a geographical map on a display;
  means for detecting a stylus starting location and a movement of a stylus, the stylus starting location corresponding to a location where the stylus contacts the display and the movement corresponding to a plurality of second locations to which the stylus is moved while contacting the display;
  means for determining a radix point, the radix point corresponding to a change in direction of the movement;
  means for identifying a stylus liftoff point, the stylus liftoff point corresponding to a location where the stylus discontinues contact with the display; and
  means for calculating a time value wherein the calculating is performed using the stylus starting location, the radix point, and the stylus liftoff point.

15. The computer program product as described in claim 14 further comprising:
  means for superimposing a clock face on the geographical map wherein the clock face includes an hour hand and a minute hand, the center of the clock face corresponding to the location of the radix point;
  means for computing an hour stroke angle using the stylus starting location and the radix point;
  means for deriving an hour setting based upon the hour stroke angle;
  means for computing a minute stroke angle using the radix point and the liftoff point;
  means for deriving a minute setting based upon the minute stroke angle; and
  means for displaying the time value on the clock face using the minute hand and the hour hand wherein the position of the minute hand corresponds to the minute setting and the position of the hour hand corresponds to the hour setting.

16. The computer program product as described in claim 15 further comprising:
  means for sensing the stylus movement in a clockwise or a counterclockwise direction subsequent to the superimposing;
  means for re-calculating the time value in response the sensing, the re-calculating resulting in a changed time value; and
  means for displaying the changed time value on the clock face using the minute hand and the hour hand.

17. The computer program product as described in claim 15 wherein the size of the clock face corresponds to the distance between the stylus starting location and the radix point.

18. The computer program product as described in claim 14 wherein a first time zone is selected corresponding to the radix point.

19. The computer program product as described in claim 18 further comprising:
  means for detecting a time zone change touch down, the time zone change touch down corresponding to a second location where the stylus contacts the display subsequent to the selection of the first time zone;
  means for comparing the time zone change touch down location with the first time zone;
  means for changing the time value based upon the comparing, wherein the changing results in a changed time value; and means for displaying the changed time value.

20. The computer program product as described in claim 14 further comprising:
  means for detecting a toggle starting location, the toggle starting location corresponding to a second location where the stylus contacts the display subsequent to the identification of the stylus liftoff point;
  means for identifying a toggle ending location, the toggle ending location corresponding to a location where the stylus discontinues contact with the display subsequent to the detected toggle starting location;
  means for determining whether to toggle an AM/PM indicator based upon the location of the toggle starting location and the toggle ending location; and
  means for toggling the AM/PM indicator in response to the determination.

21. A method of configuring time related settings using a single stylus movement, said method comprising:
  displaying a geographical map on a display;
  detecting a stylus starting location and a movement of a stylus, the stylus starting location corresponding to a location where the stylus contacts the display and the movement corresponding to a plurality of second locations to which the stylus is moved while contacting the display;
  determining a radix point, the radix point corresponding to a change in direction of the movement;
  identifying a stylus liftoff point, the stylus liftoff point corresponding to a location where the stylus discontinues contact with the display; and
  calculating a time value wherein the calculating further comprises:
  superimposing a clock face on the geographical map wherein the clock face includes an hour hand and a minute hand, the center of the clock face corresponding to the location of the radix point;
  computing an hour stroke angle using the stylus starting location and the radix point;
  deriving an hour setting based upon the hour stroke angle;
  computing a minute stroke angle using the radix point and the liftoff point; and
  deriving a minute setting based upon the minute stroke angle.

22. A method of configuring time related settings using a single stylus movement, said method comprising:
  displaying a geographical map on a display;
  detecting a stylus starting location and a movement of a stylus, the stylus starting location corresponding to a location where the stylus contacts the display and the movement corresponding to a plurality of second locations to which the stylus is moved while contacting the display;
  determining a radix point, the radix point corresponding to a change in direction of the movement;
  identifying a stylus liftoff point, the stylus liftoff point corresponding to a location where the stylus discontinues contact with the display;
  calculating a time value wherein the calculating is performed using the stylus starting location, the radix point, and the stylus liftoff point;
  superimposing a clock face on the geographical map, the center of the clock face corresponding to the location of the radix point;
  displaying the time value on the clock face using a minute hand and an hour hand;
  detecting a toggle starting location, the toggle starting location corresponding to a second location where the stylus contacts the display subsequent to the identification of the stylus liftoff point;

identifying a toggle ending location, the toggle ending location corresponding to a location where the stylus discontinues contact with the display subsequent to the detected toggle starting location;

determining whether to toggle an AM/PM indicator based upon the location of the toggle starting location and the toggle ending location; and toggling the AM/PM indicator in response to the determination.

23. An information handling system comprising:

one or more processors;

a memory accessible by the processors;

one or more nonvolatile storage devices accessible by the processors;

a display accessible by the processors; and a time setting tool to configure time using a single stylus movement, the time setting tool including:

display logic for displaying a geographical map on the display;

detection logic for detecting a stylus starting location and a movement of a stylus, the stylus starting location corresponding to a location where the stylus contacts the display and the movement corresponding to a plurality of second locations to which the stylus is moved while contacting the display;

determination logic for determining a radix point, the radix point corresponding to a change in direction of the movement;

identification logic for identifying a stylus liftoff point, the stylus liftoff point corresponding to a location where the stylus discontinues contact with the display; and computational logic for calculating a time value wherein the calculating further comprises:

imaging logic for superimposing a clock face on the geographical map wherein the clock face includes an hour hand and a minute hand, the center of the clock face corresponding to the location of the radix point;

computational logic for computing an hour stroke angle using the stylus starting location and the radix point;

derivation logic for deriving an hour setting based upon the hour stroke angle;

computational logic for computing a minute stroke angle using the radix point and the liftoff point; and derivation logic for deriving a minute setting based upon the minute stroke angle.

24. A computer program product stored in a computer operable media for configuring time related settings, said computer program product comprising:

means for displaying a geographical map on a display;

means for detecting a stylus starting location and a movement of a stylus, the stylus starting location corresponding to a location where the stylus contacts the display and the movement corresponding to a plurality of second locations to which the stylus is moved while contacting the display;

means for determining a radix point, the radix point corresponding to a change in direction of the movement;

means for identifying a stylus liftoff point, the stylus liftoff point corresponding to a location where the stylus discontinues contact with the display; and means for calculating a time value wherein the means for calculating further comprises:

means for superimposing a clock face on the geographical map wherein the clock face includes an hour hand and a minute hand, the center of the clock face corresponding to the location of the radix point;

means for computing an hour stroke angle using the stylus starting location and the radix point;

means for deriving an hour setting based upon the hour stroke angle;

means for computing a minute stroke angle using the radix point and the liftoff point; and means for deriving a minute setting based upon the minute stroke angle.

* * * * *